US012607194B2

(12) United States Patent
Lin

(10) Patent No.: US 12,607,194 B2
(45) Date of Patent: Apr. 21, 2026

(54) CONTROL SYSTEM

(71) Applicant: Chen I Lin, Taichung City (TW)

(72) Inventor: Chen I Lin, Taichung City (TW)

( * ) Notice: Subject to any disclaimer, the term of this patent is extended or adjusted under 35 U.S.C. 154(b) by 231 days.

(21) Appl. No.: 18/470,966

(22) Filed: Sep. 20, 2023

(65) Prior Publication Data

US 2025/0092878 A1     Mar. 20, 2025

(51) Int. Cl.
| | |
|---|---|
| *F04D 27/00* | (2006.01) |
| *H02J 3/00* | (2026.01) |
| *H05B 45/37* | (2020.01) |

(52) U.S. Cl.
CPC .............. *F04D 27/004* (2013.01); *H02J 3/00* (2013.01); *H05B 45/37* (2020.01)

(58) Field of Classification Search
CPC ...... H02J 3/00; H02J 13/00026; H05B 45/37; H05B 47/19; F04D 27/004; F04D 27/00
See application file for complete search history.

(56) References Cited

U.S. PATENT DOCUMENTS

2010/0327766 A1* 12/2010 Recker .................. H04L 7/0004
362/20

FOREIGN PATENT DOCUMENTS

CN          220227247 U    * 12/2023

* cited by examiner

*Primary Examiner* — Monica C King
(74) *Attorney, Agent, or Firm* — Guice Patents PLLC

(57)          ABSTRACT

The invention relates to a control system, which is composed of a main controller electrically connected to an AC chopper wall-controller, enabling users to control the AC chopper wall-controller by pressing, and the AC chopper wall-controller fully utilizes the principle of AC electricity and combining it with the characteristics of AC zero-crossing circuit, the main controller that controls an electrical appliance is capable of easily identifying signals, and at the same time, signals of the main controller will not be interfered due to a short power outage, thus capable of working stably.

10 Claims, 7 Drawing Sheets

CONTROL SYSTEM

FIELD OF THE INVENTION

The invention belongs to the technical field of fan control and lamp control, and more specifically to a control system capable of transmitting short AC signals to a fan light main controller by operating an AC chopper button on an AC chopper wall-controller. After analysis and judgment, different signals are output to the fan, thereby controlling the operation of the fan or the lamp.

DESCRIPTION OF THE RELATED ART

Generally, the control methods of ceiling fans include wire control or wall control. Wall control refers to installing a controller for speed and direction of rotation on a wall, and then using appropriate wire connection means to form an electrical connection between the controller and the motor of a ceiling fan. By operating the controller, an effect of controlling the speed and direction of rotation of the ceiling fan through wire can be achieved. However, the existing control structure is inconvenient in wiring, and the signal control wire is prone to causing signal distortion.

In the past, the AC fan light main controller or DC fan light main controller was connected in series to a wall controller. However, the wall controller is high in cost and complicated to make, and most of the wall controllers connected in series to the fan light main controller cause great interference to the fan light main controller, and therefore the AC main controller or DC main controller needs to be technically handled accordingly.

In other words, the design of the existing fan light control system is not faultless, resulting in being susceptible to interference, which affects the stability and simplicity of controlling operation of the fan light. Further improvement is necessary, which is a subject to be probe into in the invention.

SUMMARY OF THE INVENTION

Therefore, a main object of the invention is to provide a control system for applying to an electrical appliance, an AC chopper wall-controller fully utilizes the principle of AC electricity and combining it with the characteristics of AC zero-crossing circuit, a main controller that controls the electrical appliance is capable of easily identifying signals, and at the same time, signals of the main controller will not be interfered due to a short power outage, thus capable of working stably.

Furthermore, a second main object of the invention is to provide a control system capable of making accurate judgments and simultaneously outputting correct signals to a load control part, thereby effectively improving its controllability and simplicity, and further greatly improving its practicality.

The invention mainly achieves the above-mentioned objects and performance through the following technical means, which is provided for applying to a load of operation of an electrical appliance. The control system comprises an AC chopper wall-controller and a main controller, wherein the main controller comprises a rectification step-down filter circuit electrically connected to the AC chopper wall-controller, and the rectification step-down filter circuit is electrically connected and supplies power to a central control circuit. Furthermore, the main controller is equipped with a load signal detection circuit connected in parallel to the AC chopper wall-controller, and the load signal detection circuit is also connected to the central control circuit, so that the load signal detection circuit is capable of inputting a control signal to the central control circuit.

DETAILED DESCRIPTION OF THE INVENTION

Figure 1:
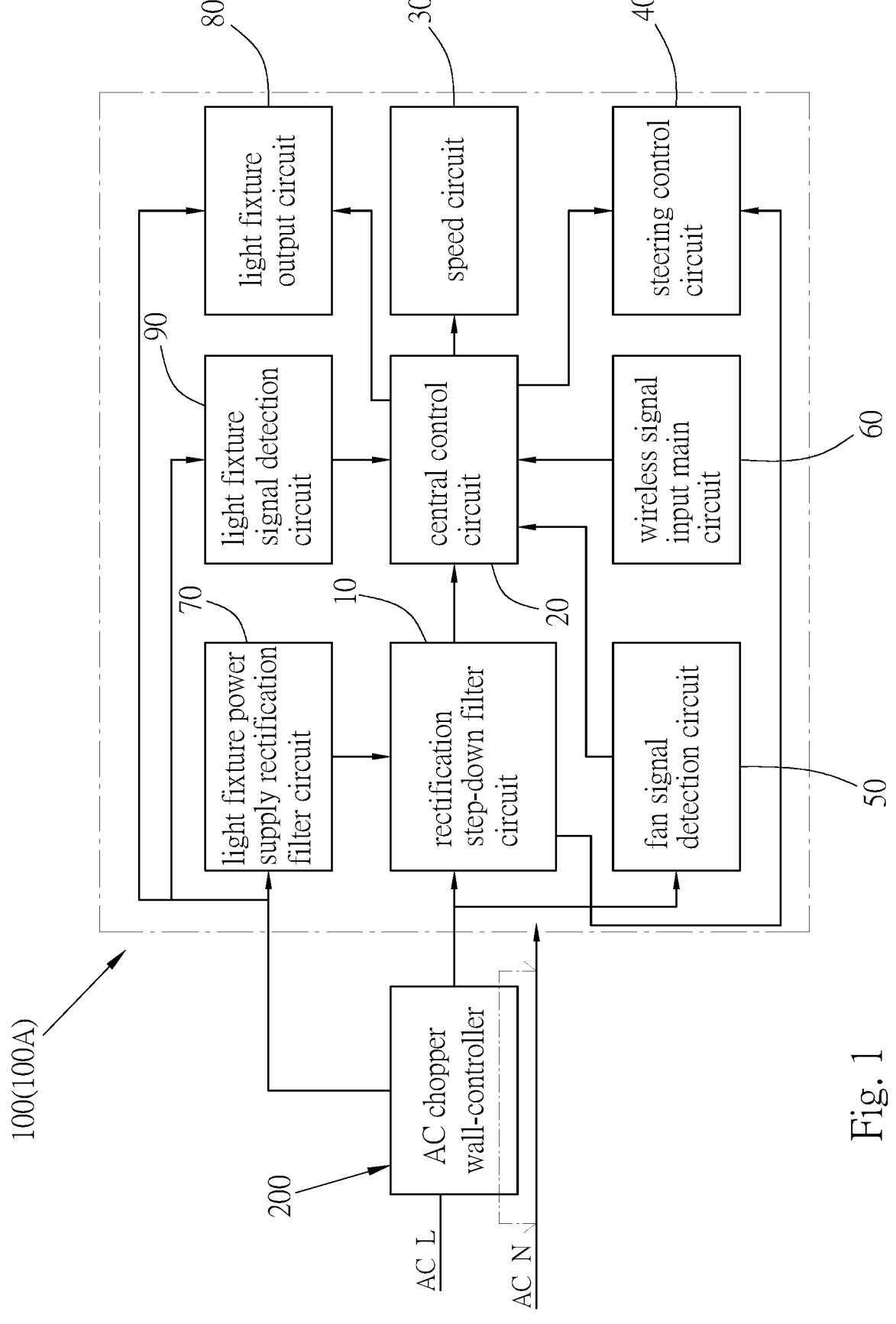
FIG. 1 is a schematic diagram of system architecture of a first preferred embodiment of the invention.
Figure 2:
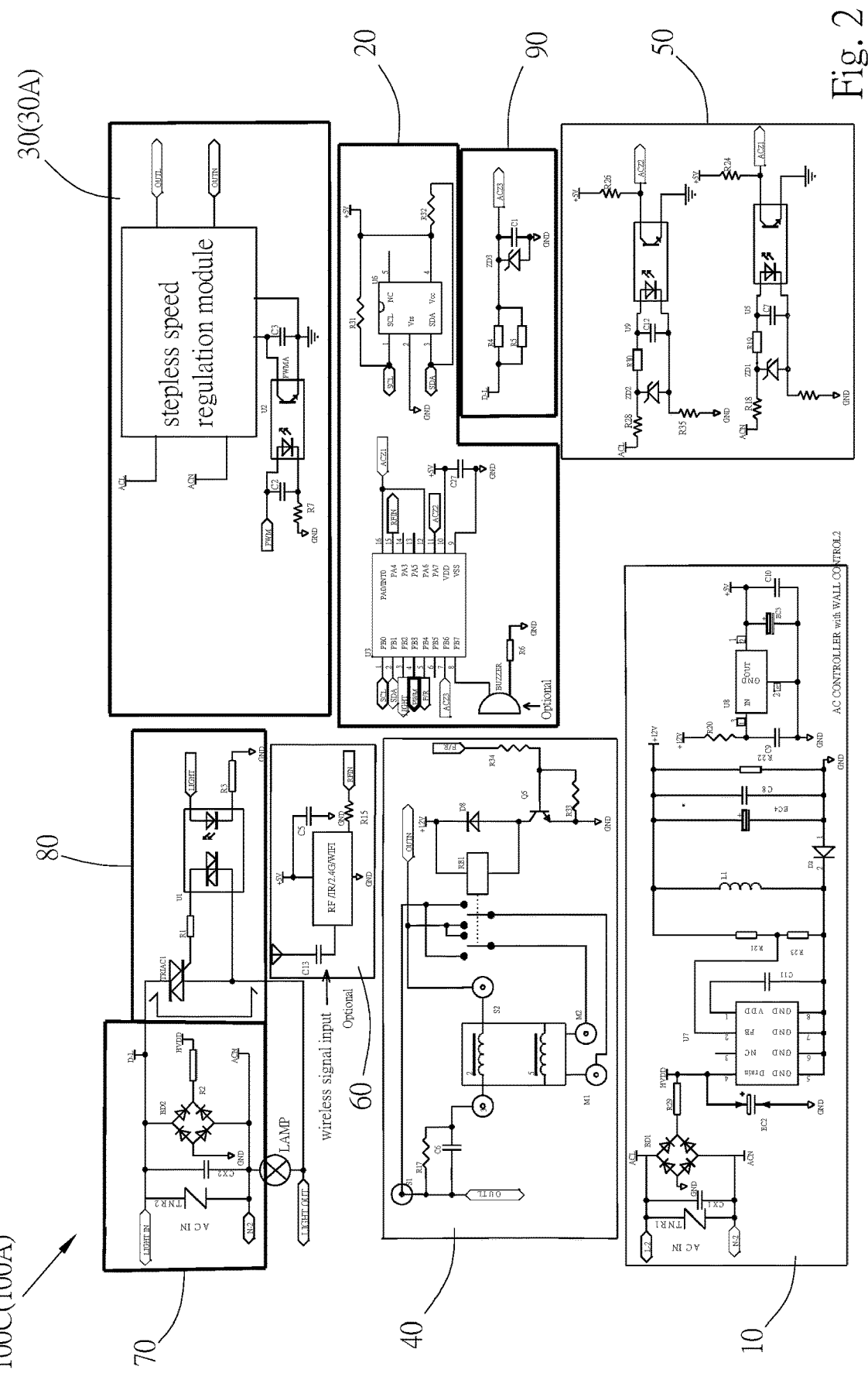
FIG. 2 is a circuit diagram of a main controller in the first preferred embodiment of the invention.
Figure 3:
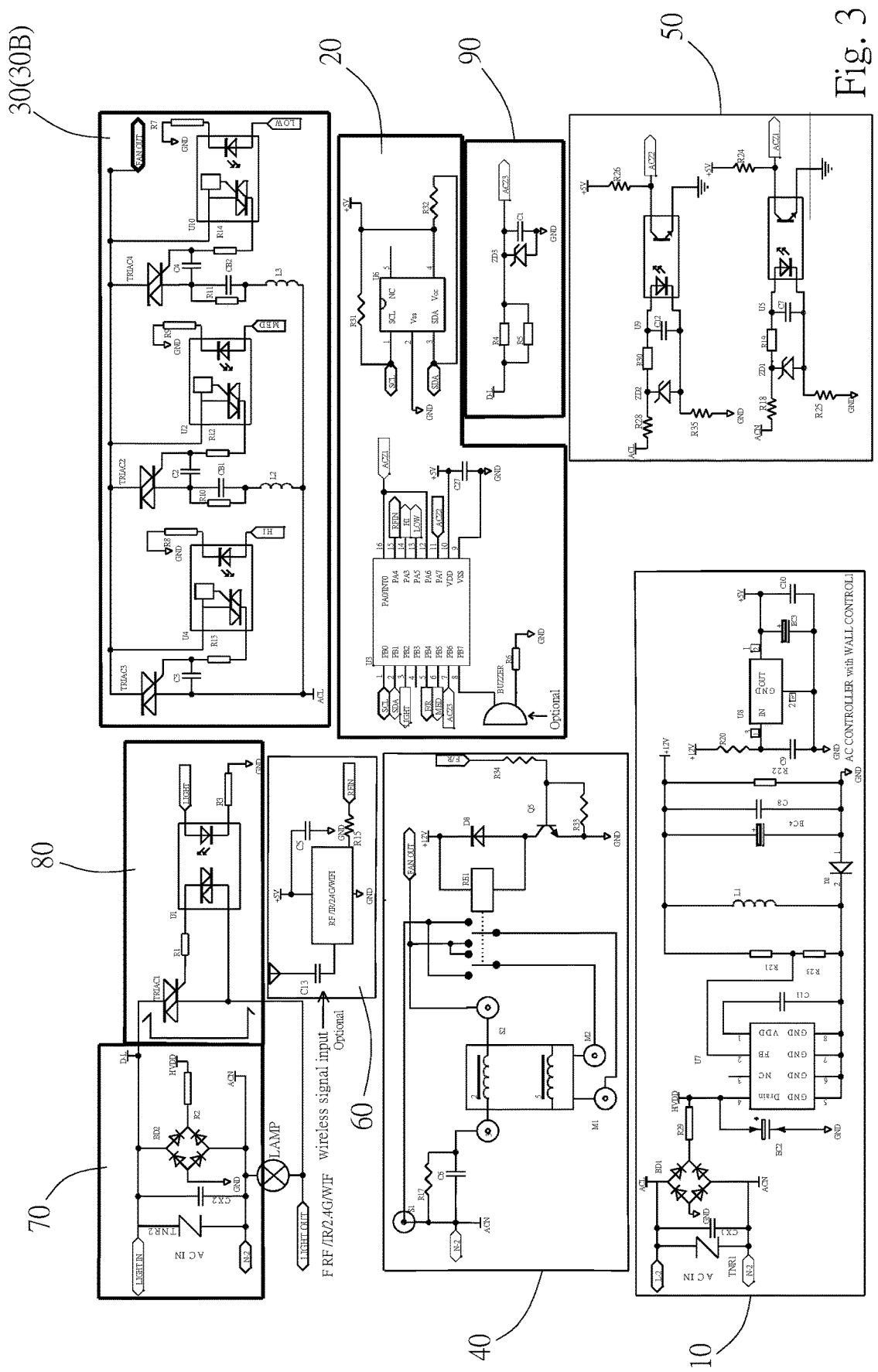
FIG. 3 is a circuit diagram of another state of the main controller in the first preferred embodiment of the invention.
Figure 4:
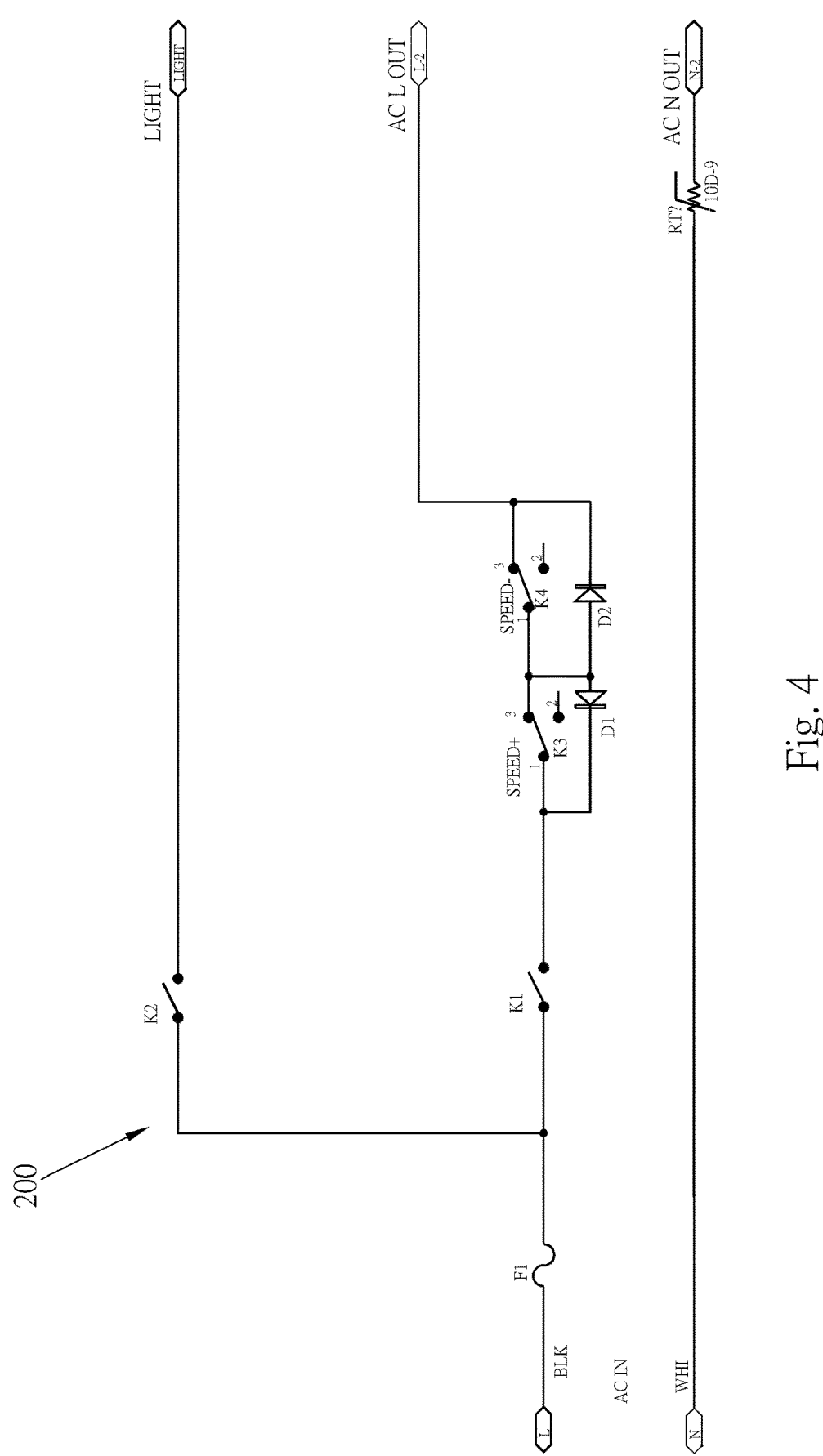
FIG. 4 is a circuit diagram of an AC chopper wall-controller of the invention.

A control system provided by a first embodiment of the invention is applied to control of operation of at least one electrical appliance, the electrical appliance can be but is not limited to fan, ceiling fan, garden light, lamp or fan light. The electrical appliance in this embodiment is a fan light and has two different loads, and the loads are a fan of the fan light and a light fixture of the fan light respectively. As shown in FIGS. 1 to 3, the control system is composed of a main controller 100 electrically connected to an AC chopper wall-controller 200, enabling users to control the AC chopper wall-controller 200 by pressing. The main controller 100 recognizes a signal and outputs a control command to the fan or the light fixture of the fan light, thereby capable of controlling rotation speed and forward and reverse rotation of the fan, or controlling on/off, dimming and color adjustment of the light fixture.

Wherein the main controller 100 can be an AC main controller 100A applied to the fan of the fan light when the fan of the fan light is a fan driven by an AC motor, the AC main controller 100A comprises a rectification step-down filter circuit 10 electrically connected to the AC chopper wall-controller 200, the rectification step-down filter circuit 10 is used for rectifying, reducing and filtering an input power supply, and the rectification step-down filter circuit 10 is electrically connected and supplies power to a central control circuit 20. The central control circuit 20 is further connected with a speed circuit 30, the central control circuit 20 outputs control signals to the speed circuit 30, wherein the speed circuit 30 can be a stepless speed regulation circuit 30A with a stepless speed regulation module, as shown in FIG. 2. The speed circuit 30 can be a capacitor step-down speed circuit 30B with a capacitor step-down circuit, as shown in FIG. 4. The central control circuit 20 is connected with a steering control circuit 40, the steering control circuit 40 receives control signals from the central control circuit 20, the steering control circuit 40 is connected to the rectification step-down filter circuit 10, and the rectification step-down filter circuit 10 is used to supply power to the steering control circuit 40. The AC chopper wall-controller 200 is connected in parallel to a load signal detection circuit, according to different electrical appliances or loads, the load signal detection circuit can be divided into a fan signal detection circuit 50 and a light fixture signal detection circuit 90. The fan signal detection circuit 50 is further connected to the central control circuit 20, so that the fan signal detection circuit 50 is capable of inputting control signals to the central control circuit 20. The AC main controller 100A is provided with a wireless signal input main circuit 60 connected to the central control circuit 20, the wireless signal input main circuit 60 includes RF/2.4G/WIFI for inputting control signals into the central control circuit 20. Therefore the AC main controller 100A is compatible with wireless signal input methods, and the rectification step-down filter circuit 10 is capable of supplying power to the steering control circuit 40. According to some embodiments, the AC main controller 100A can include action control of the light fixture, wherein the AC main controller 100A is provided with a light fixture power supply rectification filter circuit 70, a light fixture output circuit 80 and the light fixture signal detection circuit 90 respectively electrically connected to the AC chopper wall-controller 200. Wherein the light fixture power supply rectification filter circuit 70 is further connected to the rectification step-down filter circuit 10, the light fixture output circuit 80 is connected to the central control circuit 20 for the central control circuit 20 to input control signals to the light fixture output circuit 80, and the light fixture signal detection circuit 90 is connected to the central control circuit 20, so that the light fixture signal detection circuit 90 is capable of inputting control signals into the central control circuit 20.

As shown in FIG. 4, a circuit of the AC chopper wall-controller 200 comprises a LIGHT line, an AC L OUT line and/or an AC N OUT line, wherein the AC L OUT line is provided with a first switch K1 provided for respectively connecting with load circuits (such as the rectification step-down filter circuit 10 and the fan signal detection circuit 50), and a second switch K2 is provided on the LIGHT line provided for connecting with the light fixture power supply rectification filter circuit 70. The AC N OUT line can be routed through or not through the AC chopper wall-controller 200, and the AC L OUT line is connected in series with a third switch K3 representing "SPEED+" and a fourth switch K4 representing "SPEED−" after the first switch K1. The AC L OUT line is disposed with two diodes D1 and D2 on one side, wherein a negative electrode end of the diode D1 is respectively connected to a pin 1 of the third switch K3 and the first switch K1 of power input; a pin 3 of the third switch K3 is respectively connected to a pin 1 of the fourth switch K4, a positive electrode end of the diode D1 and a positive electrode end of the diode D2; and a negative electrode end of the diode D2 is respectively connected to a pin 3 of the fourth switch K4 and a load output circuit. When the third switch K3 or the fourth switch K4 is pressed, a different loop is formed between a connected load circuit, so that different control signals can be input into the load.

A control mode of the invention is achieved by connecting the AC chopper wall-controller 200 and the AC main controller 100A according to FIG. 1, FIG. 2 and FIG. 4, and an AC power supply is turned on at the same time. An operation mode is as follows.

Embodiment 1: Fan Speed Increase in Stepless Speed Regulation Mode

After short pressing the third switch K3 representing speed-up "SPEED+" (for example, about 200 MS~1000 MS) on the AC chopper wall-controller 200, the central control circuit 20 on the AC main controller 100A performs detection, such as "ACZ1" of a detection port pin 16 of the central control circuit 20 will detect a high level of 5V once (for example, about 200 MS~1000 MS). That is, after short pressing is released, the "ACZ1" of the detection port pin 16 of the central control circuit 20 on the AC main controller 100A will detect a 50/60 HZ square wave of ACZ, and at the same time, "ACZ2" of a detection port pin 11 of the central control circuit 20 will detect a low level of 0V once (for example, about 200 MS~1000 MS). That is, after short pressing is released, the "ACZ2" of the detection port pin 11 of the central control circuit 20 on the AC main controller 100A will detect a 50/60 HZ square wave of ACZ again. At this time, a pin 4 of the central control circuit 20 will output a PWM signal to the stepless speed regulation circuit 30A, so that a speed of the fan will increase by one speed number; after the third switch K3 on the AC chopper wall-controller 200 is pressed again, the "ACZ1" of the detection port pin 16 and the "ACZ2" of the detection port pin 11 of the central control circuit 20 will detect again, and the pin 4 of the central control circuit 20 outputs another PWM signal to the stepless speed regulation circuit 30A, so that a speed of the fan will increase again until reaching a highest speed number controlled by the AC main controller 100A.

Embodiment 2: Fan Speed Decrease in Stepless Speed Regulation Mode

After short pressing the fourth switch K4 representing speed reduction "SPEED−" (for example, about 200 MS~1000 MS) on the AC chopper wall-controller 200, the "ACZ1" of the detection port pin 16 of the central control circuit 20 on the AC main controller 100A will detect a low level of 0V once (for example, about 200 MS~1000 MS). That is, after short pressing is released, the "ACZ1" of the detection port pin 16 of the central control circuit 20 on the AC main controller 100A will detect a 50/60 HZ square wave of ACZ again. At the same time, the "ACZ2" of the detection port pin 11 of the central control circuit 20 will detect a high level of 5V once (for example, about 200 MS~1000 MS). That is, after short pressing is released, the "ACZ2" of the detection port pin 11 of the central control circuit 20 on the AC main controller 100A will detect a 50/60 HZ square wave of ACZ again. At this time, the pin 4 of the central control circuit 20 will output a PWM signal to the stepless speed regulation circuit 30A, so that a speed of the fan will decrease by one speed number; after the fourth switch K4 on the AC chopper wall-controller 200 is pressed again, the "ACZ1" of the detection port pin 16 and the "ACZ2" of the detection port pin 11 of the central control circuit 20 will detect again, causing the pin 4 of the central control circuit 20 to output another PWM signal to the stepless speed regulation circuit 30A, so that a speed of the fan will decrease again until reaching a lowest speed number controlled by the AC main controller 100A.

Embodiment 3: Adjustment of Fan Speed by Capacitor Step-Down

In addition, please refer to FIG. 3, in which the speed circuit 30 of the AC main controller 100A adopts the capacitor step-down speed circuit 30B. After the AC main controller 100A has detected a signal of the third switch K3 or the fourth switch K4 on the AC chopper wall-controller 200, "HI" of a corresponding pin 14 in the central control circuit 20 can be controlled to output a signal of high speed number, or "MED" of a corresponding pin 6 in the central control circuit 20 can be controlled to output a signal of medium speed number, or "LOW" of a corresponding pin 13 in the central control circuit 20 can be controlled to output a signal of low speed number to control conduction or non-conduction of each power device, thereby capable of controlling operation of the fan at high speed, medium speed or low speed.

Embodiment 4: Operating Forward Rotation of the Fan

After pressing and holding the third switch K3 on the AC chopper wall-controller 200 for about 2~5 S, the "ACZ1" of the detection port pin 16 of the central control circuit 20 of the AC main controller 100A detects a high level of 5V once for about 2~5 S; at the same time, the "ACZ2" of the detection port pin 11 of the central control circuit 20 detects a low level of 0V once for about 2~5 S, and then when the "ACZ1" of the detection port pin 16 and the "ACZ2" of the detection port pin 11 respectively detect a 50/60 HZ square wave of ACZ, a pin 5 of the central control circuit 20 is capable of outputting a low level, so that a relay in the steering control circuit 40 does not close, causing the fan to rotate forward.

Embodiment 5: Operating Reverse Rotation of the Fan

After pressing and holding the fourth switch K4 on the AC chopper wall-controller 200 for about 2~5 S, the "ACZ1" of the detection port pin 16 of the central control circuit 20 of the AC main controller 100A detects a low level of 0V once for about 2~5 S; at the same time, the "ACZ2" of the detection port pin 11 of the central control circuit 20 detects a high level of 5V once for about 2~5 S, and then when the "ACZ1" of the detection port pin 16 and the "ACZ2" of the detection port pin 11 respectively detect a 50/60 HZ square wave of ACZ, the pin 5 of the central control circuit 20 is capable of outputting a high level, so that a relay in the steering control circuit 40 closes, causing the fan to rotate reversely.

Embodiment 6: Forcibly Turning Off the Fan

When the power switch K1 corresponding to the fan on the AC chopper wall-controller 200 is pressed, the fan is forcibly turned off.

Embodiment 7: Action Notification

When a pin 8 of the central control circuit 20 of the AC main controller 100A is connected to a buzzer, when the AC chopper wall-controller 200 has a button action (for example, the first switch K1, the second switch K2, the third switch K3 or the fourth switch K4), and when the fan or the light fixture is in action, the buzzer will make a warning sound (this action can be reserved for optional use).

Embodiment 8: Memory Function in Power Outage

After the first switch K1 of power supply on the AC chopper wall-controller 200 controlling the fan is turned off (in an open circuit state), the "ACZ1" of the pin 16 and the "ACZ2" of the pin 11 of the central control circuit 20 receive a high level of 5V or a low level of 0V, if there is no ACZ waveform of 50/60 HZ after 1 second, then the central control circuit 20 on the AC main controller 100A is capable of detecting a continuous high level of 5V or a low level of 0V for more than 1 second (that is, although power is cut off, the central control circuit 20 on the AC main controller 100A still has electrolytic reserve power in the circuit for its operation for more than 2 S), immediately write down the current state, when it is turned on next time, it will directly run the state before shutdown. For example, the fan was running at third speed before power was cut off, the fan will still be running at third speed after the next power on.

Embodiment 9: Actions of the Light Fixture

When the AC chopper wall-controller 200 is added with a light fixture function wire such as "LIGHT" line, a first mode is to enter the AC main controller 100A together with a N line, through actions of on-off times of the second switch K2 of power supply of the AC chopper wall-controller 200, such as turning on the second switch K2 after power-on, disconnecting once and connecting again, or connecting and disconnecting twice, or connecting and disconnecting thrice, a detection port pin 7 of the central control circuit 20 of the AC main controller 100A detects changes of ACZ3 signal. For example, it is a 50/60 HZ square wave in normal state, when the second switch K2 of power supply is turned off, the regular 50/60 HZ square wave will be disconnected in the middle. If regular 50/60 HZ square wave is detected 1~2 S after disconnecting, then a pin 3 of the central control circuit 20 outputs a corresponding light control signal to control a conduction state of TRIAC, such as tangent angle, so as to control changes of the load light fixture, such as dimming and color adjustment. Another mode is a straight-through mode, which is also the easiest way, that is, the second switch K2 of light control on the AC chopper wall-controller 200 is directly connected to the LED light fixture or an ordinary incandescent lamp to directly control on/off of the light fixture or control on/off, dimming and color adjustment of the LED light fixture through several connecting and disconnecting actions.

Figure 5:
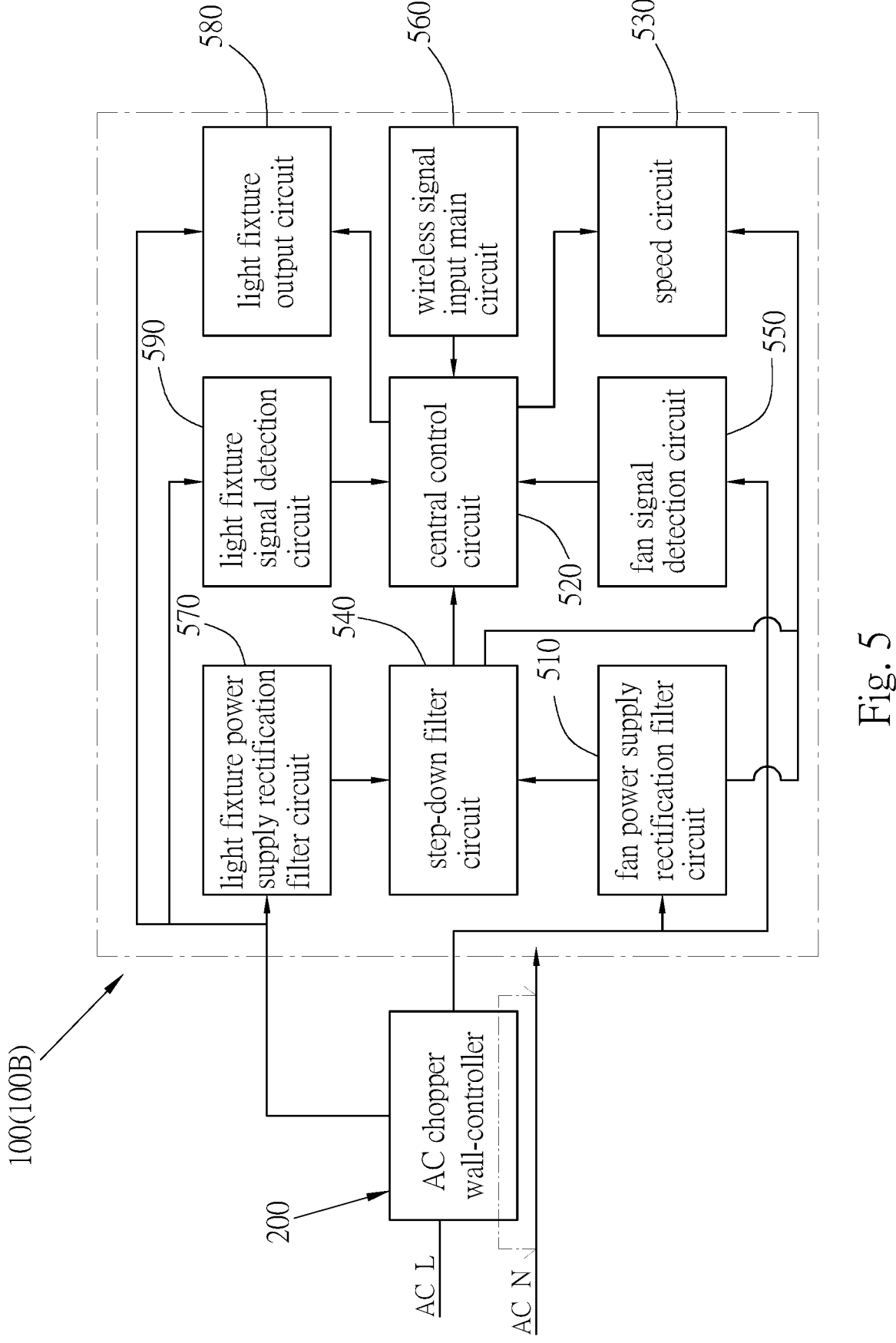
FIG. 5 is a schematic diagram of system architecture of a second preferred embodiment of the invention.
Figure 6:
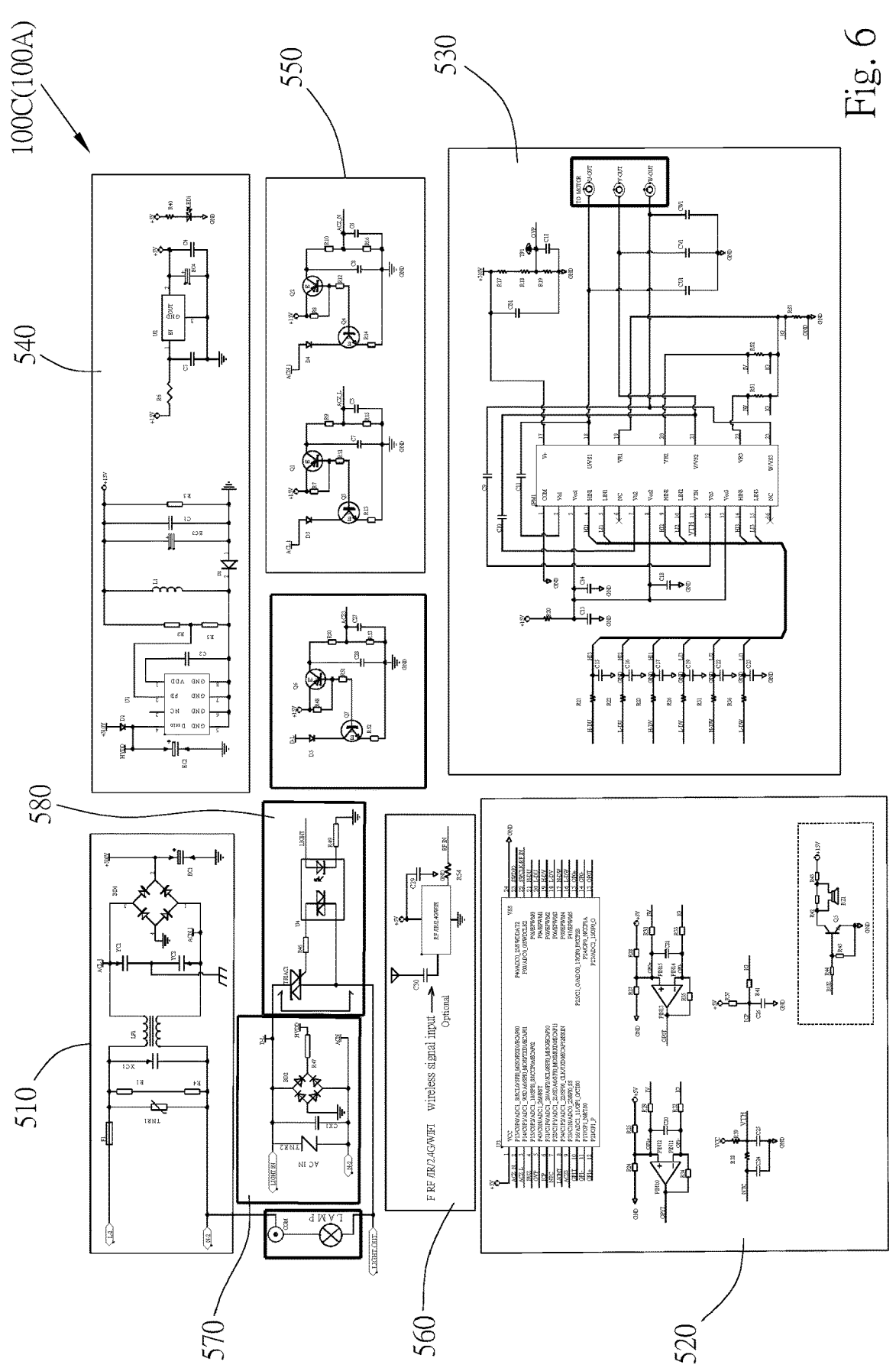
FIG. 6 is a circuit diagram of the main controller in the second preferred embodiment of the invention.

Moreover, a second preferred embodiment of the control system of the invention is shown in FIG. 5 and FIG. 6, wherein the main controller 100 can be a DC main controller 100B applied to the fan of the fan light when the fan of the fan light is a fan driven by a DC motor, the DC main controller 100B comprises a fan power supply rectification filter circuit 510 electrically connected to the AC chopper wall-controller 200, the fan power supply rectification filter circuit 510 is used for rectifying and filtering an input power supply, and the fan power supply rectification filter circuit 510 is electrically connected to a step-down filter circuit 540. The step-down filter circuit 540 is electrically connected to a central control circuit 520, so that the DC main controller 100B is capable of supplying power supply to the central control circuit 520 through the fan power supply rectification filter circuit 510 and the step-down filter circuit 540. The central control circuit 520 is further connected with a speed circuit 530, the central control circuit 520 outputs control signals to the speed circuit 530, and the speed circuit 530 can have a forward and reverse controllable output circuit as shown in FIG. 6. Furthermore, the AC chopper wall-controller 200 is further connected in parallel to a load signal detection circuit, according to different electrical appliances or loads, the load signal detection circuit can be divided into a fan signal detection circuit 550 and a light fixture signal detection circuit 590, and the fan signal detection circuit 550 is further connected to the central control circuit 520, so that the fan signal detection circuit 550 is capable of inputting control signals into the central control circuit 520. The DC main controller 100B is provided with a wireless signal input main circuit 560 connected to the central control circuit 520, the wireless signal input main circuit 560 includes RF/2.4G/WIFI provided for the wireless signal input main circuit 560 to input control signals into the central control circuit 520. Therefore the DC main controller 100B is compatible with wireless signal input methods, and the fan power supply rectification filter circuit 510 and the step-down filter circuit 540 are capable of further supplying power to the speed circuit 530. Furthermore, according to some embodiments, the DC main controller 100B can further include action control of the light fixture, wherein the DC main controller 100B is provided with a light fixture power supply rectification filter circuit 570, a light fixture output circuit 580 and the light fixture signal detection circuit 590 respectively electrically connected to the AC chopper wall-controller 200. Wherein the light fixture power supply rectification filter circuit 570 is further connected to the step-down filter circuit 540, the light fixture output circuit 580 is connected to the central control circuit 520 for the central control circuit 520 to input control signals into the light fixture output circuit 580, and the light fixture signal detection circuit 590 is connected to the central control circuit 520, so that the light fixture signal detection circuit 590 is capable of inputting control signals into the central control circuit 520.

A control mode of the invention is achieved by connecting the AC chopper wall-controller 200 and the DC main controller 100B according to FIG. 5 and FIG. 6, and a power supply is turned on at the same time. An operation mode is as follows.

Embodiment 10: Increase in Fan Speed

After short pressing the third switch K3 representing speed-up "SPEED+" (for example, about 200 MS~1000 MS) on the AC chopper wall-controller 200, the central control circuit 520 on the DC main controller 100B performs detection, such as "ACZ N" of a detection port pin 2 of the central control circuit 520 will detect a high level of 5V once (for example, about 200 MS~1000 MS). That is, after short pressing is released, the "ACZ N" of the detection port pin 2 of the central control circuit 520 on the DC main controller 100B will detect a 50/60 HZ square wave of ACZ, and at the same time, "ACZ L" of a detection port pin 3 of the central control circuit 520 will detect a low level of 0V once (for example, about 200 MS~1000 MS). That is, after short pressing is released, the "ACZ L" of the detection port pin 3 of the central control circuit 520 on the DC main controller 100B will detect a 50/60 HZ square wave of ACZ again. At this time, a pin 16 to a pin 21 of the central control circuit 520 will output a corresponding signal to the speed circuit 530, so as to make corresponding action responses for speed number control and forward and reverse control, so that a speed of the fan will increase by one speed number; after the third switch K3 on the AC chopper wall-controller 200 is pressed again, the "ACZ N" of the detection port pin 2 and the "ACZ L" of the detection port pin 3 of the central control circuit 520 will detect again, and the pin 16 to the pin 21 of the central control circuit 520 output another corresponding signal to the speed circuit 530, so that a speed of the fan will increase again until reaching a highest speed number controlled by the DC main controller 100B.

Embodiment 11: Decrease in Fan Speed

After short pressing the fourth switch K4 representing speed reduction "SPEED–" (for example, about 200 MS~1000 MS) on the AC chopper wall-controller 200, the "ACZ N"" of the detection port pin 2 of the central control circuit 520 on the DC main controller 100B will detect a low level of 0V once (for example, about 200 MS~1000 MS). That is, after short pressing is released, the "ACZ N"" of the detection port pin 2 of the central control circuit 520 on the DC main controller 100B will detect a 50/60 HZ square wave of ACZ again. At the same time, the "ACZ L" of the detection port pin 3 of the central control circuit 520 will detect a high level of 5V once (for example, about 200 MS~1000 MS). That is, after short pressing is released, the "ACZ L" of the detection port pin 3 of the central control circuit 520 on the DC main controller 100B will detect a 50/60 HZ square wave of ACZ again. At this time, the pin 16 to the pin 21 of the central control circuit 520 will output a corresponding signal to the speed circuit 530, so as to make corresponding action responses for speed number control and forward and reverse control, so that a speed of the fan will decrease by one speed number; after the fourth switch K4 on the AC chopper wall-controller 200 is pressed again, the "ACZ N"" of the detection port pin 2 and the "ACZ L" of the detection port pin 3 of the central control circuit 520 will detect again, causing the pin 16 to the pin 21 of the central control circuit 520 output another corresponding signal to the speed circuit 530, so that a speed of the fan will decrease again until reaching a lowest speed number controlled by the DC main controller 100B.

Embodiment 12: Operating Forward Rotation of the Fan

After pressing and holding the third switch K3 on the AC chopper wall-controller 200 for about 2~5 S, the "ACZ N"" of the detection port pin 2 of the central control circuit 520 of the DC main controller 100B detects a high level of 5V once for about 2~5 S; at the same time, the "ACZ L" of the detection port pin 3 of the central control circuit 520 detects a low level of 0V once for about 2~5 S, and then when the "ACZ N"" of the detection port pin 2 and the "ACZ L" of the detection port pin 3 respectively detect a 50/60 HZ square wave of ACZ, the pin 5 of the central control circuit 520 is capable of outputting a low level, so that a relay in the steering control circuit 40 does not close, causing the fan to rotate forward.

Embodiment 13: Operating Reverse Rotation of the Fan

After pressing and holding the fourth switch K4 on the AC chopper wall-controller 200 for about 2~5 S, the "ACZ N"" of the detection port pin 2 of the central control circuit 520 of the DC main controller 100B detects a low level of 0V once for about 2~5 S; at the same time, the "ACZ L" of the detection port pin 3 of the central control circuit 520 detects a high level of 5V once for about 2~5 S, and then when the "ACZ N"" of the detection port pin 2 and the "ACZ L" of the detection port pin 3 respectively detect a 50/60 HZ square wave of ACZ, the pin 16 to the pin 21 of the central control circuit 520 are capable of outputting a corresponding signal to the speed circuit 530 to control the fan, causing the fan to rotate reversely.

Embodiment 14: Memory Function in Power Outage

After the first switch K1 of power supply on the AC chopper wall-controller 200 controlling the fan is turned off (in an open circuit state), the "ACZ N"" of the detection port pin 2 and the "ACZ L" of the detection port pin 3 of the central control circuit 520 receive a high level of 5V or a low level of 0V, if there is no ACZ waveform of 50/60 HZ after 1 second, then the central control circuit 520 on the DC main controller 100B is capable of detecting a continuous high level of 5V or a low level of 0V for more than 1 second (that is, although power is cut off, the central control circuit 520 on the DC main controller 100B still has electrolytic reserve power in the circuit for its operation for more than 2 S), immediately write down the current state, when it is turned on next time, it will directly run the state before shutdown. For example, the fan was running at second speed before power was cut off, the fan will still be running at second speed after the next power on.

Embodiment 15: Actions of the Light Fixture

When the AC chopper wall-controller 200 is added with a light fixture function wire such as "LIGHT" line, a first mode is to enter the DC main controller 100B together with a N line, through actions of on-off times of the second switch K2 of power supply of the AC chopper wall-controller 200, such as turning on the second switch K2 after power-on, disconnecting once and connecting again, or connecting and disconnecting twice, or connecting and disconnecting thrice, a detection port pin 9 of the central control circuit 520 of the DC main controller 100B detects changes of ACZ3 signal. For example, it is a 50/60 HZ square wave in normal state, when the second switch K2 of power supply is turned off, the regular 50/60 HZ square wave will be disconnected in the middle. If regular 50/60 HZ square wave is detected 1~2 S after disconnecting, then a pin 8 of the central control circuit 520 outputs a corresponding light control signal to control a conduction state of TRIAC, such as tangent angle, so as to control changes of the load light fixture, such as dimming and color adjustment. Another mode is a straight-through mode, which is also the easiest way, that is, the second switch K2 of light control on the AC chopper wall-controller 200 is directly connected to the LED light fixture or an ordinary incandescent lamp to directly control on/off of the light fixture or control on/off, dimming and color adjustment of the LED light fixture through several connecting and disconnecting actions.

Figure 7:
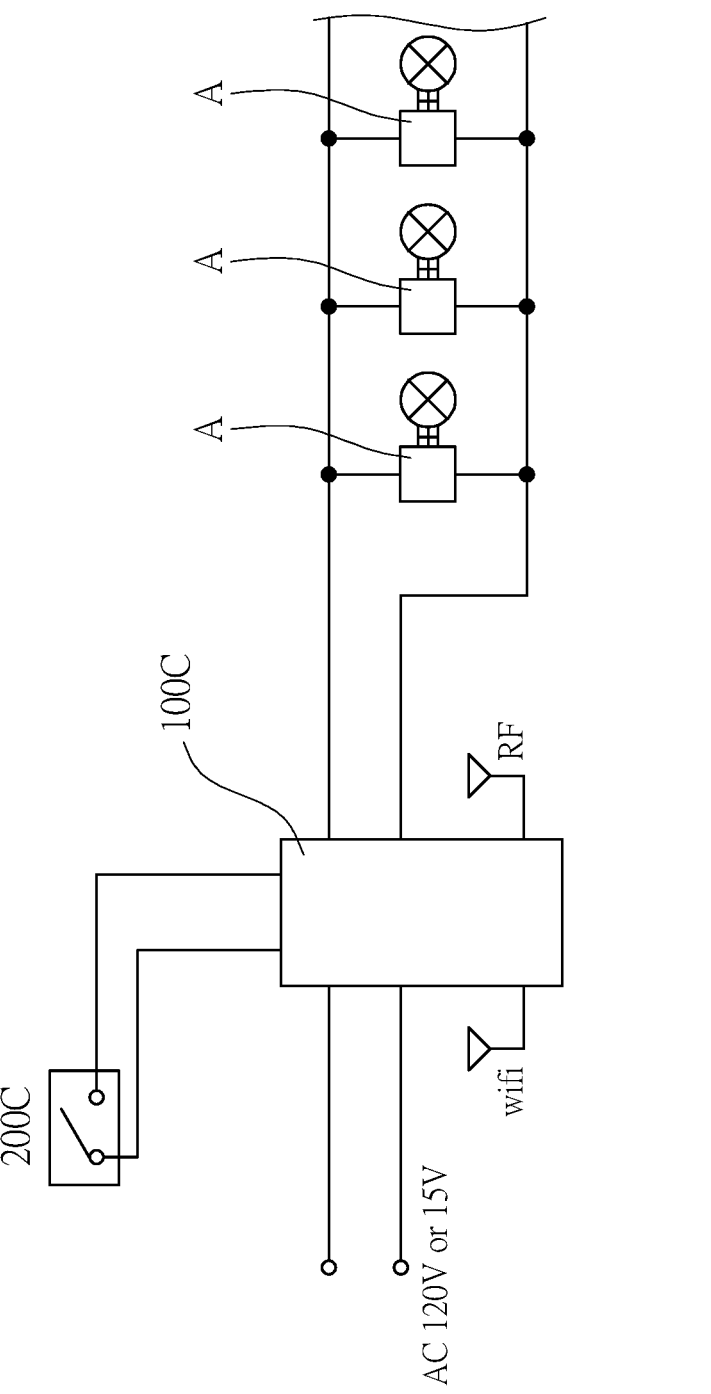
FIG. 7 is a circuit diagram of a third preferred embodiment of the invention.

In addition, in a third preferred embodiment provided by the invention as shown in FIG. 7, which uses an AC signal tangent angle as a signal source of control command, and enables a main controller 100C to control a plurality of LED drivers A individually or in group, such as LED on or off, dimming, color temperature adjustment, R.G.B LED light change control. Moreover, there is no need for extra wires (control wires) between the main controller 100C and the LED drivers A, but the original circuit wires are used as a transmission interface for control commands, which saves wiring costs. In addition, the main controller 100C can be used in cooperation with the AC chopper wall-controller 200C in controlling with remote control technology such as RF or WIFI. The main controller 100C is a AC main controller, and use TRIAC to control VAC 15V AC voltage to each LED driver A for two-wire control, the LED drivers A respectively correspond to different lighting devices, and the lighting devices can be lamps or garden lights.

Although the invention has been disclosed as above with the embodiments, it is not intended to limit the invention. A person having ordinary skill in the art to which the invention pertains can make various changes and modifications without departing from the spirit and scope of the invention.

Therefore, scope of protection of the invention shall be subject to what is defined in the pending claims.

What is claimed is:

1. A control system for applying to an electrical appliance, the control system comprising:

an AC chopper wall-controller; and a main controller comprising a rectification step-down filter circuit electrically connected to the AC chopper wall-controller, and the rectification step-down filter circuit being electrically connected and supplying power to a central control circuit, the main controller being equipped with a load signal detection circuit connected in parallel to the AC chopper wall-controller, and the load signal detection circuit being also connected to the central control circuit, so that the load signal detection circuit being capable of inputting a control signal into the central control circuit;

wherein the load signal detection circuit is a fan signal detection circuit, the central control circuit is connected with a speed circuit provided for the central control circuit to output a control signal to the speed circuit, the central control circuit is connected with a steering control circuit provided for the steering control circuit to receive a control signal from the central control circuit, the steering control circuit is connected to the rectification step-down filter circuit to use the rectification step-down filter circuit to supply electric power to the steering control circuit, and the rectification step-down filter circuit is capable of providing electric power to the steering control circuit;

wherein the main controller is provided with a wireless signal input main circuit connected to the central control circuit;

wherein the load signal detection circuit is a light fixture signal detection circuit, the main controller is provided with a light fixture power supply rectification filter circuit and a light fixture output circuit respectively electrically connected to the AC chopper wall-controller, wherein the light fixture power supply rectification filter circuit is connected to the rectification step-down filter circuit, the light fixture output circuit is connected to the central control circuit provided for the central control circuit to input control signals into the light fixture output circuit, and the light fixture signal detection circuit is connected to the central control circuit, so that the light fixture signal detection circuit is capable of inputting control signals into the central control circuit;

wherein the rectification step-down filter circuit, the light fixture power supply rectification filter circuit, the light fixture signal detection circuit, and the light fixture output circuit are electrically connected to the AC chopper wall-controller;

wherein the rectification step-down filter circuit, the light fixture power supply rectification filter circuit, the light fixture signal detection circuit, the light fixture output circuit, the fan signal detection circuit, the speed circuit, steering control circuit, and the wireless signal input main circuit are electrically connected to the central control circuit.

2. The control system as claimed in claim 1, wherein the electrical appliance is a fan.

3. The control system as claimed in claim 2, wherein a circuit of the AC chopper wall-controller comprises a LIGHT line, an AC L OUT line and/or an AC N OUT line, wherein the AC L OUT line is provided with a first switch provided for respectively connecting with the rectification step-down filter circuit and the fan signal detection circuit, the AC L OUT line is connected in series with a third switch representing speed-up and a fourth switch representing speed reduction included in the AC chopper wall-controller after the first switch, the AC L OUT line is disposed with two diodes on one side, a negative electrode end of one of the diodes is respectively connected to a pin of the third switch and the first switch of power input, a pin of the third switch is respectively connected to a pin of the fourth switch, a positive electrode end of one of the diodes and a positive electrode end of the other diode, a negative electrode end of the other diode is respectively connected to a pin of the fourth switch, the rectification step-down filter circuit and the fan signal detection circuit, when the third switch or the fourth switch is pressed, a different loop is formed between the AC main controller connected to a load.

4. The control system as claimed in claim 2, wherein the speed circuit is a stepless speed regulation circuit with a stepless speed regulation module.

5. The control system as claimed in claim 2, wherein the speed circuit is a capacitor step-down speed circuit with a capacitor step-down circuit.

6. The control system as claimed in claim 2, wherein the fan has a DC motor, the main controller is a DC main controller, the DC main controller comprises a fan power supply rectification filter circuit electrically connected to the AC chopper wall-controller, the fan power supply rectification filter circuit is electrically connected to a step-down filter circuit, the step-down filter circuit is electrically connected to the central control circuit, so that the DC main controller is capable of supplying power supply to the central control circuit through the fan power supply rectification filter circuit and the step-down filter circuit.

7. The control system as claimed in claim 2, wherein the fan has an AC motor, and the main controller is an AC main controller.

8. The control system as claimed in claim 1, wherein the wireless signal input main circuit includes RF/2.4G/WIFI for inputting control signals into the central control circuit.

9. The control system as claimed in claim 1, wherein the electrical appliance is a light fixture.

10. The control system as claimed in claim 9, wherein a circuit of the AC chopper wall-controller comprises a LIGHT line, an AC L OUT line and/or an AC N OUT line, and the LIGHT line is provided with a second switch provided for connecting to the light fixture power supply rectification filter circuit of the main controller.

\*   \*   \*   \*   \*